United States Patent
Ho et al.

(10) Patent No.: US 9,141,243 B2
(45) Date of Patent: Sep. 22, 2015

(54) ELECTRONIC DEVICE INCLUDING TOUCH-SENSITIVE DISPLAY AND METHOD OF DETECTING TOUCHES

(71) Applicant: BLACKBERRY LIMITED, Waterloo (CA)

(72) Inventors: Christopher Ying Wai Ho, Markham (CA); Amit Pal Singh, Waterloo (CA); Bergen Albert Fletcher, Kitchener (CA)

(73) Assignee: BlackBerry Limited, Waterloo (CA)

( * ) Notice: Subject to any disclaimer, the term of this patent is extended or adjusted under 35 U.S.C. 154(b) by 64 days.

(21) Appl. No.: 14/016,881

(22) Filed: Sep. 3, 2013

(65) Prior Publication Data

US 2015/0062059 A1    Mar. 5, 2015

(51) Int. Cl.
*G06F 3/044* (2006.01)
*G06F 1/32* (2006.01)
*G06F 3/041* (2006.01)

(52) U.S. Cl.
CPC .............. *G06F 3/044* (2013.01); *G06F 1/3262* (2013.01); *G06F 1/3265* (2013.01); *G06F 3/0412* (2013.01); *G06F 2203/04106* (2013.01)

(58) Field of Classification Search
CPC ... G06F 3/0488; G06F 3/04883; G06F 3/044; G06F 3/04886; G06F 3/045
USPC .......................................................... 345/173
See application file for complete search history.

(56) References Cited

U.S. PATENT DOCUMENTS

| | | | |
|---|---|---|---|
| 2008/0192019 | A1 | 8/2008 | Lee et al. |
| 2012/0127124 | A1 | 5/2012 | Zanone et al. |
| 2012/0262416 | A1 | 10/2012 | Kitamura |
| 2013/0076648 | A1 | 3/2013 | Horst et al. |
| 2013/0155007 | A1 | 6/2013 | Huang et al. |
| 2013/0293507 | A1* | 11/2013 | Singh et al. ................... 345/174 |
| 2014/0043247 | A1* | 2/2014 | Singh et al. ................... 345/173 |

OTHER PUBLICATIONS

Extended European Search Report dated Jan. 19, 2015, issued in respect of corresponding European Patent Application No. 14183467.1.

* cited by examiner

*Primary Examiner* — Kevin Nguyen
(74) *Attorney, Agent, or Firm* — Geoffrey deKleine; Borden Ladner Gervais LLP

(57) ABSTRACT

An electronic device includes a display controller, first drive electrodes operably coupled to the display controller to drive the first drive electrodes to detect touches on a display while the electronic device is operating in a normal power condition, a touch controller operably coupled to the display controller, second drive electrodes operably coupled to the touch controller to drive the second drive electrodes to detect touches on the display while the electronic device is operating in a reduced power condition, and sense electrodes operably coupled to the touch controller.

20 Claims, 3 Drawing Sheets

ELECTRONIC DEVICE INCLUDING TOUCH-SENSITIVE DISPLAY AND METHOD OF DETECTING TOUCHES

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touchscreen display, is particularly useful on handheld devices, which are small and may have limited space for user input and output. The information displayed on the display may be modified depending on the functions and operations being performed.

Improvements in electronic devices with touch-sensitive displays are desirable.

DETAILED DESCRIPTION

Figure 1:
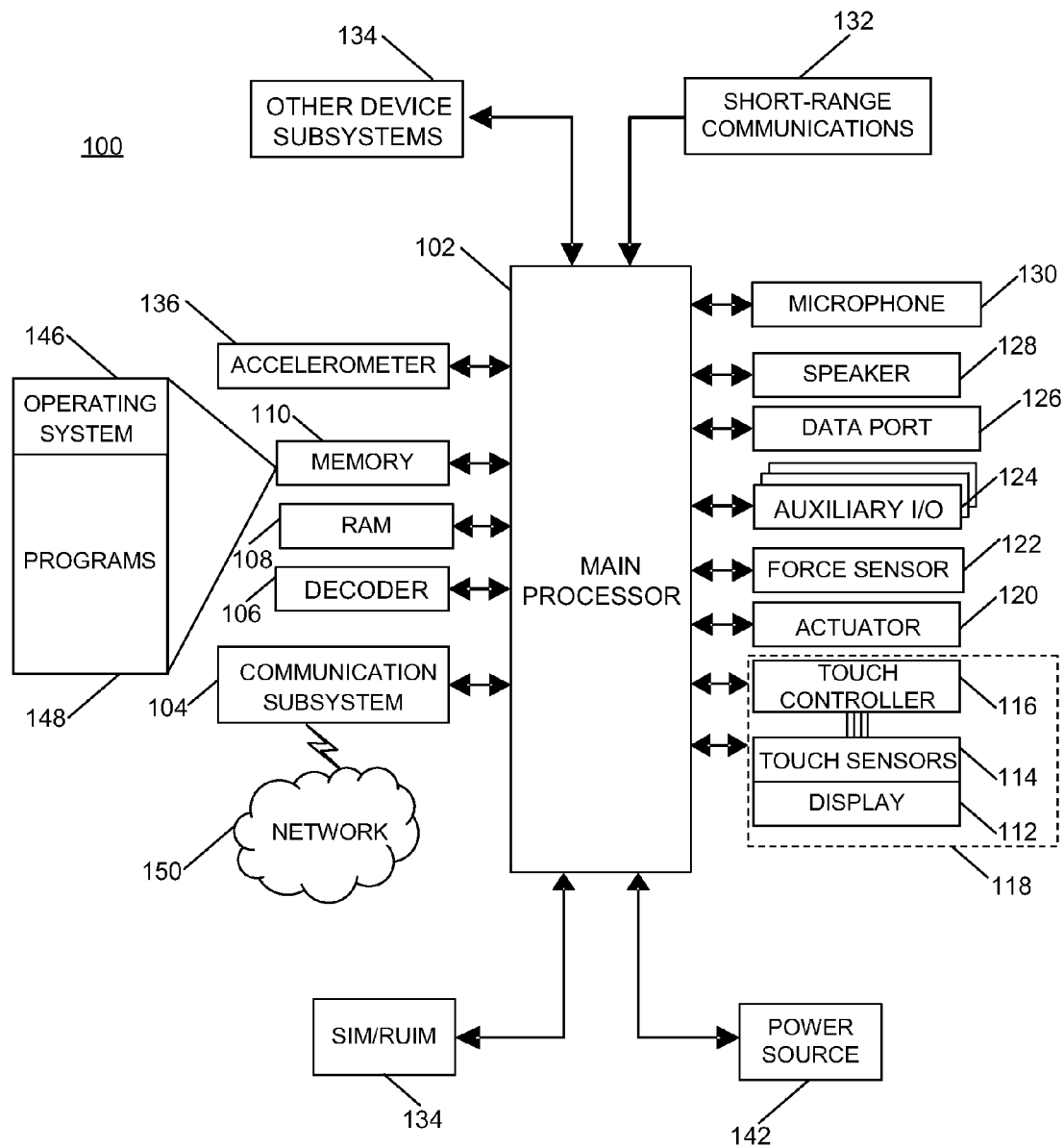
FIG. 1 is a block diagram of a portable electronic device in accordance with the disclosure.

The following describes a method and an electronic device that includes a display controller that are operably coupled to first drive electrodes to drive the first drive electrodes to detect touches on a display of the electronic device while the electronic device is operating in a normal power condition. The electronic device also includes a touch controller operably coupled to the display controller and to second drive electrodes to drive the second drive electrodes to detect touches on the display while the electronic device is operating in a reduced power condition. Sense electrodes are operably coupled to the touch controller. Thus, the display controller is utilized to drive the first drive electrodes when in the normal power condition and the touch controller is utilized to drive the second drive electrodes when in the reduced power condition.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may also be a portable electronic device without wireless communication capabilities, such as a handheld electronic game device, digital photograph album, digital camera, media player, e-book reader, and so forth.

A block diagram of an example of a portable electronic device 100 is shown in FIG. 1. The portable electronic device 100 includes multiple components, such as a processor 102 that controls the overall operation of the portable electronic device 100, which processor 102 is a hardware device or apparatus that may include memory. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are operably coupled to a touch controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
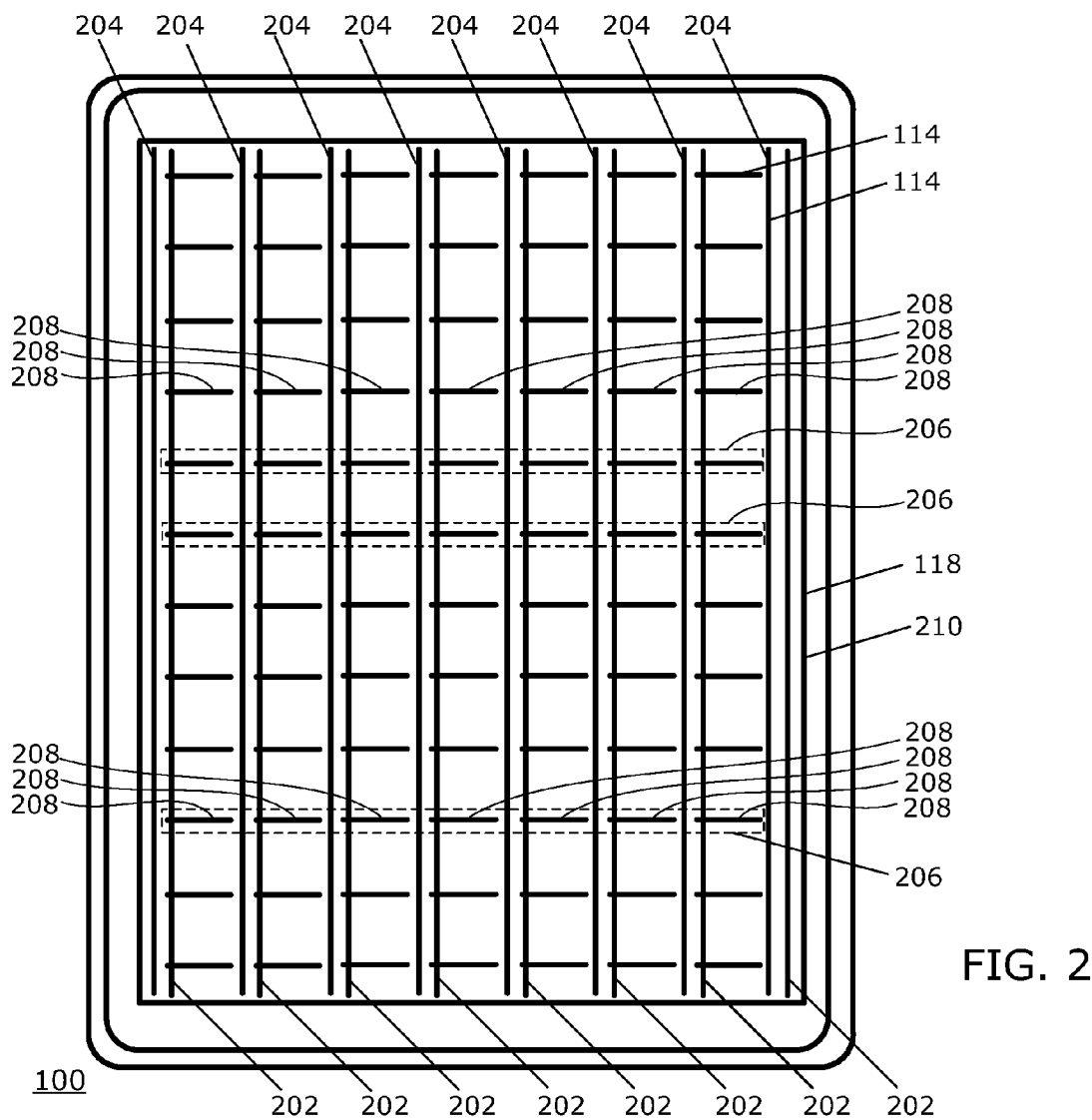
FIG. 2 is a front view of an example of an electronic device in accordance with the disclosure.

A front view of an example of an electronic device 100 is shown in FIG. 2. The electronic device 100 includes the touch-sensitive display 118. The touch-sensitive display 118 may be a capacitive touch-sensitive display. The display 112 includes display electrodes 202, also known as common electrodes. The display electrodes 202 are also utilized as the drive electrodes for touch sensing when the electronic device 100 is in a normal or operating power condition. In this example, the display electrodes 202 function as common electrodes and drive electrodes. The touch sensors 114 include drive electrodes, referred to herein as on-cell drive electrodes 204, and sense electrodes 206. The on-cell drive electrodes 204 may be disposed on a substrate of the display 112, on any layer of the display, or on a substrate disposed on the display. For example, the on-cell drive electrodes 204 may be disposed on a color filter or color filter substrate of the display 112 and are utilized as the drive electrodes for touch sensing when the electronic device 100 is in reduced or low-power condition, as described below. The display electrodes 202 are different than and do not include the on-cell drive electrodes 204. The sense electrodes 206 comprise a plurality of electrode segments 208 that extend between but do not touch or contact the on-cell drive electrodes 204. Each of the plurality of electrode segments 208 for one sense electrode 206 are coupled together by wiring or lead lines (not shown) that electrically couple the segments 208 to the touch controller 116, such that the segments 208 together form a generally linear electrode 206. The sense electrodes 206 are generally illustrated as linear electrodes. Any other suitable shape may be utilized. For example, the sense electrodes 206 may be generally U-shaped. The segments 208 do not cross over or under the on-cell drive electrodes 204. The segments 208 may cross over the display electrodes 202.

The touch-sensitive display 118 includes a display area 210 in which information may be displayed, and a non-display area extending around and beyond the periphery of the display area. The display area includes the area inside the rectangle 210 in FIG. 2. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. The on-cell drive electrodes 204 and the sense electrodes 206 may be disposed in the non-display area, which on-cell drive electrodes 204 and the sense electrodes 206 may extend from the display electrodes 202 and the sense electrodes 206 in the display area or may be distinct or separate from the electrodes 202 and sense electrodes 206 in the display area. A touch, such as a gesture, may be associated with the display area, the non-display area, or both areas. The on-cell drive electrodes 204 and the sense electrodes 206 may optionally extend across substantially the entire non-display area or may optionally be disposed in only part of the non-display area.

The display electrodes 202, the on-cell drive electrodes 204, and the sense electrodes 206 may comprise any suitable material, such as indium tin oxide (ITO). The display electrodes 202 and the sense electrodes 206 are not visible when viewing the electronic device 100 without utilizing an optical instrument, such as a microscope, loupe, or magnifying glass, but are shown as visible in FIG. 2 and FIG. 4 for the purpose of illustration. In the example of FIG. 2, the display electrodes 202 and the on-cell drive electrodes 204 are the longer or vertical electrodes, and the sense electrodes 206 are the horizontal electrodes. Alternatively, the display electrodes 202 and the on-cell drive electrodes 204 may be the horizontal electrodes, and the sense electrodes 206 may be the vertical electrodes.

Figure 3:
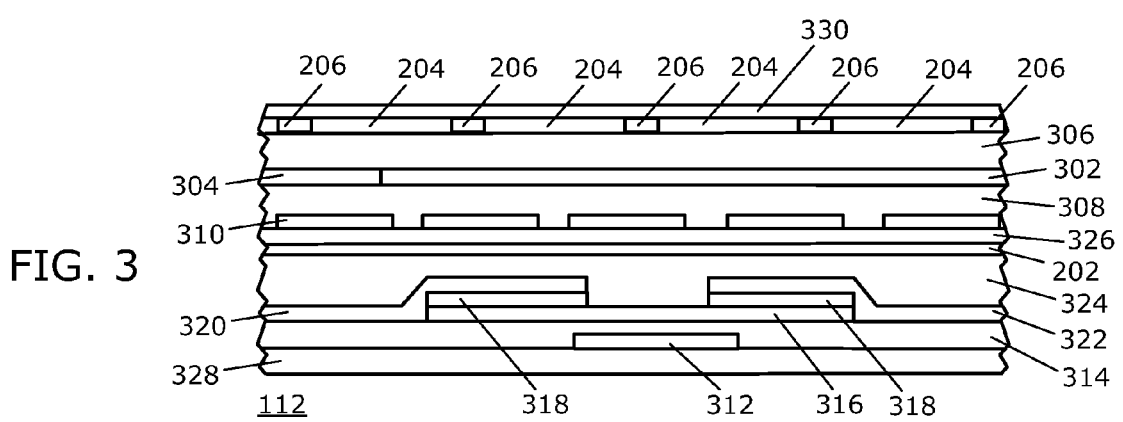
FIG. 3 is a partial cross-section of an example of a touch-sensitive display in accordance with the disclosure.

A partial cross-section of an example of a touch-sensitive display 118 is shown in FIG. 3. The display 112 may include, for example, a color filter 302 and black matrix 304 disposed on a substrate 306. The display 112 may also include, for example, liquid crystal 308 disposed between pixel electrodes 310 and the color filter 302 and display elements including: gate lines 312, a gate insulator 314, amorphous silicon semiconductor film 316, n-type amorphous silicon (n$^+$-a-Si) film 318, source/drain electrodes 320, 322, an insulator 324, also known as an inter-layer dielectric, the common electrodes, referred to herein as display electrodes 202, and an upper insulator 326, all disposed on a substrate 328.

In this example, the on-cell drive electrodes 204 and the sense electrodes 206 are disposed on the substrate 306, for example, by patterning ITO disposed on the substrate 306. The color filter 302 and black matrix 304 are disposed on one side of the substrate 306, and the on-cell drive electrodes 204 and the sense electrodes 206 are disposed on the opposite side of the substrate 306 in this example. An outer polarizer 330 is disposed on the sense electrodes 204. The sense electrodes 206 cross over or under the on-cell drive electrodes 204 and are not electrically connected to the on-cell drive electrodes 204.

Figure 4:
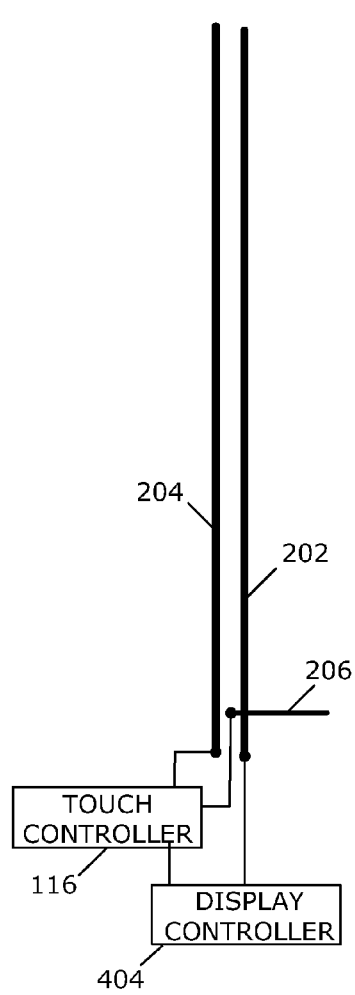
FIG. 4 is a diagram illustrating a sense electrode and a drive electrode operably coupled to controllers in accordance with the disclosure.

A diagram illustrating an example of a display electrode 202, an on-cell drive electrode 204, and a sense electrode 206 is shown in FIG. 4. The electrodes 202 are operably coupled to the display controller 404 that is part of the display 112. The display controller 404, also referred to as a display driver, drives the display electrodes 202 to detect touches when the electronic device 100 operates in the normal power condition. The display electrodes 202 also function as common electrodes that are utilized to display information on the display 112. The on-cell drive electrodes 204 are operably coupled to the touch controller 116. The touch controller 116 drives the on-cell drive electrodes 204 to detect touches when the electronic device 100 is in the reduced power condition. The sense electrodes 206 are operably coupled to the touch controller 116 and send the sense signals to the touch controller 116 for touch detection in the normal power condition and in reduced power condition.

The display controller 404 and the touch controller 116 are operably coupled together to communicate and coordinate driving of the display electrodes 202 while sensing with the sense electrodes 206 when the electronic device 100 is operating in the normal power condition. The touch controller 116 may control the display controller 404 by sending signals to the display controller 404 to control the timing of driving the electrodes 202 while sensing utilizing the sense electrodes 206 to detect touches.

The display electrodes 202, the on-cell drive electrodes 204, and the sense electrodes 206 may be utilized to detect touches by mutual-capacitance touch sensing. To detect a touch when the electronic device 100 is operating in a normal power condition, the display electrodes 202 are driven by the display controller 404 such that the drive signal, comprising one or more pulses, is applied to or carried by the display electrodes 202. The sense electrodes 206 are utilized to detect changes in the sense signal at the nodes that are the locations at which the sense electrodes 206 cross over the display electrodes 202. To determine a touch location, a scanning operation is performed on the touch-sensitive display 118 by driving the display electrodes 202 while sense signals from sense electrodes 206 are received by the touch controller 116, which sense signals are responsive to the drive signals. A scan of the touch-sensitive display 118 typically includes multiple frames. In a frame, a display electrode 202 is driven utilizing a drive signal comprising multiple pulses, while receiving sense signals from the sense electrodes 206. A display electrode 202 may be driven in multiple frames of a scan while sensing utilizing the sense electrodes 206. The on-cell drive electrodes 204 are not utilized to detect touches when the electronic device is operating in the normal power condition. Alternatively, the on-cell drive electrodes 204 may be utilized as sense electrodes to detect touches when the electronic device 100 is in the normal power condition. The on-cell drive electrodes 204 and the sense electrodes 206 may both be utilized as sense electrodes in the normal power condition.

In normal or operating power condition, the electronic device 100 is, for example, fully powered, fully operational, the display 112 is powered, and so forth. The electronic device 100 may perform any or all functions in the normal or operating power condition. When operating in a reduced power condition, or low-power condition, the display 112, including the display controller 404, may be powered down to operate in a standby condition or at reduced power. Reduced power condition, or low-power condition, which may be referred to as a "sleep" condition or state, is a condition in which no information is typically displayed on the touch-sensitive display. During reduced power condition, other processes with the electronic device 100 may be discontinued or operated at a slower speed, and one or more hardware components may be powered-down or operated at a slower speed to conserve power or provide other advantages. The electronic device 100 may enter or begin operating in reduced power condition when the processor 102 determines that no touch is detected on the touch-sensitive display 118 for a predetermined period of time, when no input is generally detected by the electronic device 100 for predetermined period of time, when the device is locked by selection of a button or receipt of a gesture on the touch-sensitive display 118, or when the device is placed in a holster or covered by a cover, to name a few examples.

To detect a touch when the display 112 is operating in a reduced power condition, the display controller 404 does not drive the display electrodes 202. In reduced power condition, the touch controller 116 drives the on-cell drive electrodes 204 such that drive signal is carried by the on-cell drive electrodes 204, and the sense signals, including touch data, are received by the touch controller 116 from the sense electrodes 204.

Figure 5:
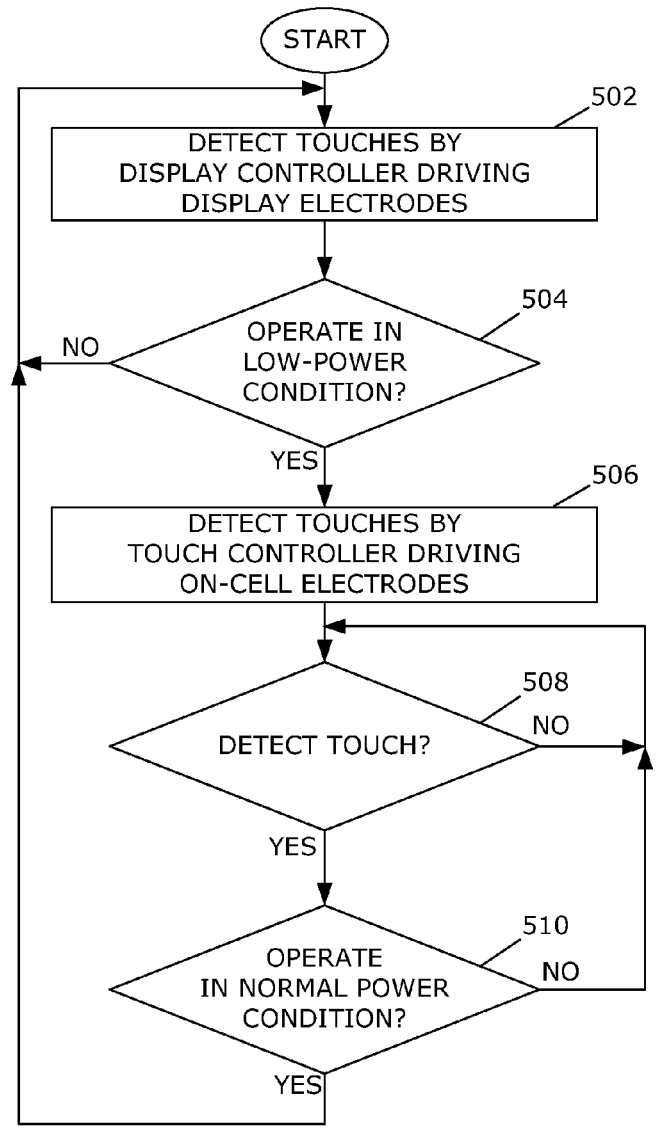
FIG. 5 is a flowchart illustrating an example of a method of detecting touches on a touch-sensitive display in accordance with the disclosure.

A flowchart illustrating an example of a method of detecting touches on the touch-sensitive display 118 is shown in FIG. 5. The method may be carried out by software executed, for example, by the processor 102 and/or the touch controller 116. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable storage medium, device, or apparatus, which may be a non-transitory or tangible storage medium.

While the portable electronic device 100 operates in a normal power condition, touches are detected 502 by driving the display electrodes 202. The display controller 404 drives the display electrodes 202 while the touch controller 116 receives signals from the sense electrodes 206 to detect touches. The display electrodes 202 are also utilized as common electrodes to display information on the display 112. The touch controller 116 is operably coupled to the display controller 404 to control the timing of driving and sensing during touch detection when operating in normal power condition.

When the device 100 enters 504 a reduced power condition, touches are detected 506 by driving the on-cell drive electrodes 204. The touch controller 116 drives the on-cell drive electrodes 204 to detect touches. While the electronic device 100 is in reduced power condition, the touch controller 116 drives the on-cell drive electrodes 204 while the touch controller receives sense signals from the sense electrodes 206. The processor 102 may control entry or transition into reduced power condition. An indication or command to operate in reduced power condition may be sent from the processor 102 to the touch controller 116 and the display controller 404. In the reduced power condition, the display 112 does not display information. The display 112, including the display controller 404, is powered down by reducing or discontinuing providing power to the display, thus putting the display to "sleep." The display controller 404 is not utilized to drive the electrodes 202, and the display electrodes 202 are not driven to detect touches while in reduced power condition.

When a touch, which may be a gesture, is detected 508, the touch data is compared to stored touch data to determine 510 when the touch comprises input that triggers or initiates operation in normal power condition by "waking up" or powering up the display 112 and the display controller 404. Return to normal power condition may include, for example, displaying an unlock screen to unlock the electronic device 100 to engage full operation of the electronic device 100 or to wake up the electronic device 100. In response to detecting entry into normal power condition, the process continues at 502.

To return to normal power condition, the touch controller 116 may send an indication or a command to power up the display 112 and the display controller 404. The touch controller 116 discontinues driving the on-cell drive electrodes 204 upon transition to normal power condition. The touch controller 116 may also send a signal to the processor 102 to "wake up" or power up the processor 102.

By driving the display electrodes 202 while in normal power condition and driving the on-cell drive electrodes 204 while in reduced power condition, touch detection is facilitated in both normal power condition and reduced/low-power condition. In normal power condition, touches, including gestures, may be detected by the display controller 404 driving the display electrodes 202 to detect touches and display information. In reduced power condition, touches, including gestures, may be detected by the touch controller driving the on-cell drive electrodes 204 while facilitating turning off or powering down the display 112. When operating in normal power condition, touches may be detected in an electronic device 100 that includes touch sensors integrated or formed in the display, such as an in-cell touch-sensitive display 118. When operating in reduced power condition, touches, including gestures and gesture direction, may be detected by the touch controller 116 driving the drive electrodes 204. The drive electrodes 204 may be disposed on the same layer or plane of the touch-sensitive display 118 as the sense electrodes 204. Touches may be detected without need to power the display controller 404 during a reduced power condition.

Touches, including gestures, that wake up or power up the electronic device 100 may be detected when the electronic device 100 is in a low-power or reduced power condition, and the display, including the display controller, need not be utilized. Power utilized by the display controller may be very high compared to the touch controller. Detecting touches in reduced power condition without powering the display controller reduces power consumption.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. An electronic device comprising:
   a display controller;
   first drive electrodes operably coupled to the display controller to drive the first drive electrodes to detect touches on a display while the electronic device is operating in a normal power condition;
   a touch controller operably coupled to the display controller;
   second drive electrodes operably coupled to the touch controller to drive the second drive electrodes to detect touches on the display while the electronic device is operating in a reduced power condition;
   sense electrodes operably coupled to the touch controller.

2. The electronic device according to claim 1, wherein the first drive electrodes comprise common electrodes utilized to display information on the display.

3. The electronic device according to claim 1, wherein the second drive electrodes and the sense electrodes are disposed on a substrate of the display.

4. The electronic device according to claim 1, wherein the touch controller controls the display controller to detect touches on the display when the electronic device is operating in the normal power condition.

5. The electronic device according to claim 1, wherein the display controller is powered down when the electronic device is in the reduced power condition.

6. The electronic device according to claim 1, wherein, the touch controller is operably coupled to the display controller and configured to, in response to detecting a touch in response to driving the second drive electrodes, send a signal to the display controller to operate the electronic device in the normal power condition.

7. The electronic device according to claim 1, wherein the display is not utilized to display information when the electronic device is operating in the reduced power condition.

8. The electronic device according to claim 1, wherein the second drive electrodes are not driven to detect touches when the electronic device is operating in the normal power condition.

9. The electronic device according to claim 1, wherein signals are received, by the touch controller, from the sense electrodes and the second drive electrodes when the first drive electrodes are driven to detect touches in the normal power condition.

10. A method comprising:
    while in a normal power condition, detecting touches on a display of an electronic device by driving first drive electrodes disposed in the display and sensing utilizing sense electrodes disposed on a substrate of the display;

while in a reduced power condition, detecting touches on the display by driving second drive electrodes and sensing utilizing the sense electrodes;

wherein the first drive electrodes are different than the second drive electrodes.

11. The method according to claim 10, wherein the first drive electrodes are driven by a display controller when in the normal power condition.

12. The method according to claim 10, wherein the second drive electrodes are driven by a touch controller when in the reduced power condition.

13. The method according to claim 10, wherein the first drive electrodes comprise common electrodes utilized to display information on the display.

14. The method according to claim 10, wherein the display controller is not utilized to detect touches when in the reduced power condition.

15. The method according to claim 10, comprising powering down the display controller when the electronic device enters the reduced power condition.

16. The method according to claim 10, wherein entry into the reduced power condition is controlled by a processor coupled to the touch controller and to the display controller.

17. The method according to claim 10, comprising, in response to detecting a touch on the touch-sensitive display while in the reduced power condition, operating in the normal power condition.

18. The method according to claim 10, comprising sensing by receiving signals from the second drive electrodes when the first drive electrodes are driven to detect touches while in the normal power condition.

19. A non-transitory computer-readable storage device having computer-readable code stored thereon, the computer-readable code executable by at least one processor of the portable electronic device to perform the method of claim 10.

20. An electronic device comprising:

a display controller;

common electrodes operably coupled to the display controller to display information on the display, wherein the common electrodes are driven to detect touches on a display while the electronic device is operating in a normal power condition;

a touch controller operably coupled to the display controller;

drive electrodes disposed on a substrate of the display and operably coupled to the touch controller to drive the drive electrodes to detect touches on the display while the electronic device is operating in a reduced power condition;

sense electrodes disposed on the substrate of the display and operably coupled to the touch controller to detect touches on the display when the electronic device is in the reduced power condition and to detect touches when the electronic device is in the normal power condition;

wherein the display controller is not utilized to drive the common electrodes to detect touches when the electronic device is in the reduced power condition and the drive electrodes are not driven to detect touches when the electronic device is in the normal power condition.

* * * * *